United States Patent [19]

Neuman

[11] Patent Number: 4,682,257
[45] Date of Patent: Jul. 21, 1987

[54] MICRO FLOPPY DISC HEAD CLEANER

[75] Inventor: Eli Neuman, Chatsworth, Calif.

[73] Assignee: Perfectdata Corporation, Chatsworth, Calif.

[21] Appl. No.: 717,552

[22] Filed: Mar. 29, 1985

[51] Int. Cl.$^4$ .......................... G11B 5/41; G11B 23/02
[52] U.S. Cl. ...................................... 360/128; 360/133
[58] Field of Search .................. 360/99, 128, 133, 137

[56] References Cited

U.S. PATENT DOCUMENTS

| | | | |
|---|---|---|---|
| 4,263,634 | 4/1981 | Chenoweth | 360/133 |
| 4,374,404 | 2/1983 | Davis | 360/99 X |
| 4,498,114 | 2/1985 | Davis | 360/128 |
| 4,503,473 | 3/1985 | Eyler et al. | 360/128 |
| 4,558,386 | 12/1985 | Kara | 360/128 |
| 4,589,044 | 5/1986 | Lindberg | 360/133 |

FOREIGN PATENT DOCUMENTS

| | | | |
|---|---|---|---|
| 58-758019 | 9/1983 | Japan | 360/128 |
| 8501378 | 3/1985 | United Kingdom | 360/128 |

*Primary Examiner*—Stuart N. Hecker
*Assistant Examiner*—Alyssa H. Bowler
*Attorney, Agent, or Firm*—Spensley Horn Jubas & Lubitz

[57] ABSTRACT

A device for cleaning the magnetic heads in flexible disk equipment or the like. The device includes a cleaning disk made of an absorbant and porous fibrous material having an area saturatable with a liquid cleaning solution. The cleaning disk is rotatably supported within an essentially flat shell made of plastic or other material, the shell being similar to the plastic shells often used to contain flexible magnetic disks used in such equipment. The shell includes on one side an opening enabling the cleaning disk to come into contact with a magnetic head. Opposite the opening on the other side of the cleaning disk is disposed a removable member. In one embodiment, this member is a spring biased to press the cleaning disk against the magnetic head, while in another embodiment a flexible spring is pressed by a pressure pad of the flexible disk equipment against the cleaning disk so that the cleaning disk is pressed against the magnetic head, the flexible spring protecting the pressure pad from the cleaning disk and cleaning solution used. In each embodiment, the spring is removable to expose an opening in the second side of the plastic shell opposite the first opening so that the magnetic heads in flexible disk equipment using oppositely disposed magnetic heads may be simultaneously cleaned. The shell is also provided with one or more other openings which expose the cleaning disk to facilitate saturation of a portion of the cleaning disk with a liquid cleaning solution while leaving a portion of the cleaning disk dry. When the device is placed within a flexible disk system which rotates the saturated disk, the magnetic head or heads are cleaned in a nonabrasive fashion with an alternating wet-dry action.

9 Claims, 5 Drawing Figures

U.S. Patent   Jul. 21, 1987   4,682,257
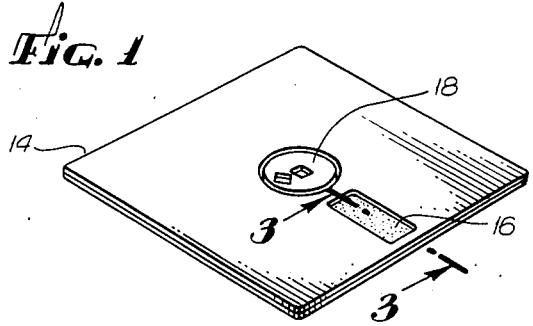
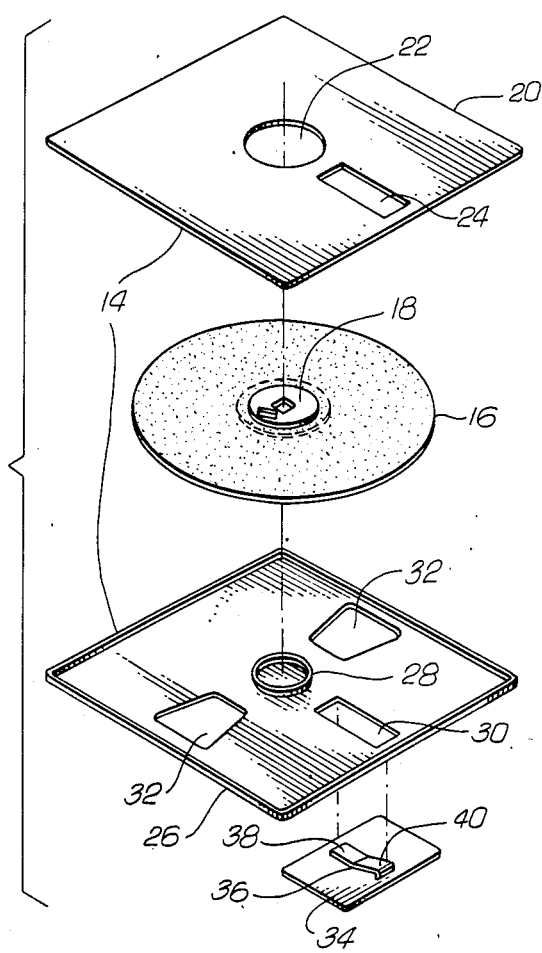
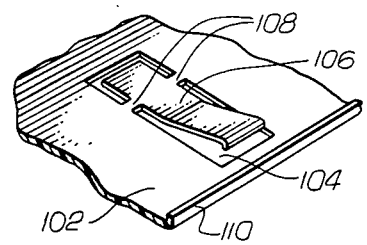
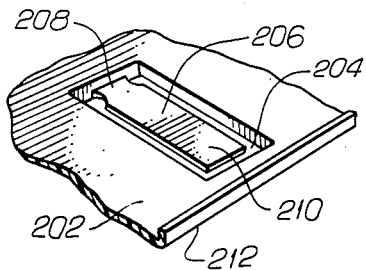
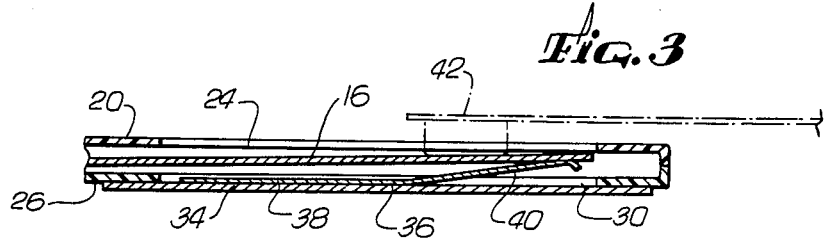

MICRO FLOPPY DISC HEAD CLEANER

BACKGROUND OF THE INVENTION

1. Field of the Invention

This invention relates to a device for cleaning the magnetic head or heads in a flexible disk system of the type in which the flexible magnetic disk is disposed in a shell. With flexible disk drives, as with other pieces of data processing equipment, preventive care and periodic maintenance are necessary to insure efficient, smooth and error-free operation. The magnetic heads in such a system are generally extremely difficult to access without partially disassembling the drive system. With the present invention, the heads in flexible drive systems employing a magnetic head on one side of the disk may be cleaned without damage to the oppositely disposed pressure pad, or, in flexible disk systems using oppositely disposed heads, such heads may be simultaneously cleaned.

2. Prior Art

In order to clean the magnetic heads of a flexible disk system in which the heads are oppositely disposed to one another, a cleaning disk made of an absorbant, lint-free and porous material which has been substantially saturated with a liquid cleaning solution over part of its area has been used, the heads being cleaned by the alternate wet-dry action of the rotating cleaning disk.

With respect to flexible disk systems using a magnetic head on one side of the disk and a pressure pad on the opposite side of the disk a different configuration must be used with respect to some flexible disk systems in order that the pressure pad not be damaged through contact with the rotating cleaning disk or the cleaning solution. In order to protect the pressure pad, a cover over the opening in the side of the shell adjacent to the pressure pad has been used. One approach has been to fabricate a tab integral with the side of the shell of the cleaning disk covering the opening in the shell opposite to that provided for the magnetic head. The pressure pad therefore presses against the tab rather than the cleaning disk and does not come in contact with the cleaning disk. In the case of flexible disk systems using oppositely disposed magnetic heads, the plastic tab can be broken away from the shell exposing an opening in the shell for a second magnetic head to contact the cleaning disk.

Alternatively, adhesively coated paper has been used to cover the opening in the shell on the side of the pressure pad, so that the pressure pad does not come into contact with the cleaning disk. The adhesively backed paper is peeled away if the cleaning disk is to be used with a flexible disk system employing oppositely disposed magnetic heads, thereby allowing such heads to access the cleaning disk.

When such devices are used with flexible disk systems in which a magnetic head is located on one side of the disk and a pressure pad on the opposite side, as the pressure pad is effectively disabled from pressing the cleaning disk against the magnetic head, less than satisfactory cleaning has been obtained, the cleaning disk not being pressed against the magnetic head with pressure sufficient to effectively clean the disk.

It is therefore an object of this invention to provide a device for effectively cleaning a magnetic head in a flexible disk system employing a pressure pad opposite the magnetic head without damage to the pressure pad.

It is another object of the present invention to provide such a device which is easily adaptable to clean oppositely opposed magnetic heads in flexible disk systems employing such.

It is still a further object of the present invention to provide a device which cleans magnetic heads using an alternating wet-dry sequence employing a rotatable cleaning disk disposed in a shell.

SUMMARY OF THE INVENTION

These and other objects are achieved by providing a head cleaning device which includes a cleaning disk made of an absorbent, lint free and porous material which has an area saturatable with a liquid cleaning solution and a dry area. The cleaning disk is rotatably supported within a shell and is provided with a hub of the type used by the flexible magnetic disks in the flexible disk system so that it is rotatable by the disk drive when inserted into the flexible disk system. The cleaning disk includes an opening on one side to expose the cleaning disk to the magnetic head of a flexible disk system. Opposite the opening on the other side of the cleaning disk is located a removable member for pressing the cleaning disk against the magnetic head.

In one embodiment, the removable member is a spring biased to press the cleaning disk against a magnetic head when the device is inserted into a flexible disk system of the type using a magnetic head disposed on one side of a magnetic disk. The spring is removable to expose an opening in the second side of the shell opposite the opening in the first side of the shell. With the spring so removed, the device can be inserted into a flexible disk system employing magnetic heads on opposite sides of the disk, the magnetic heads pressing against the cleaning disk opposite one another.

In another embodiment, the spring comprises a thin flexible member disposed over an opening in the second side of the shell opposite the opening for the magnetic head in the first side of the shell. When the device is inserted into a flexible disk system employing a magnetic head on one side of a disk and a pressure pad on the opposite side, the pressure pad presses the flexible spring against the cleaning disk, which in turn presses against the magnetic head.

For use with flexible disk systems employing magnetic heads disposed on opposite sides of the disk, the flexible spring is broken off of the shell to expose the opening in the second side. When the device is inserted into a flexible disk system using oppositely disposed magnetic heads, the magnetic heads press against the cleaning disk opposite one another.

In the present invention, the shell has one or more additional openings to facilitate saturation of a portion of the cleaning disk area with a cleaning solution. The cleaning solution does not rapidly diffuse through the entire area of the cleaning disk so that when the disk is inserted into a flexible disk system, the magnetic heads are cleaned with an alternating wet-dry sequence as the cleaning disk rotates.

BRIEF DESCRIPTION OF THE DRAWINGS

FIG. 1 is a perspective view of a first preferred embodiment of the present invention showing a cleaning disk disposed in a shell.

FIG. 2 is an exploded view of the preferred embodiment of the present invention shown in FIG. 1.

FIG. 3 is a partial cross-sectional view of the preferred embodiment of the present invention shown in FIG. 1 taken along the lines 3—3 in FIG. 1 and including a magnetic head in phantom.

FIG. 4 is a partial cutaway view of a portion of the shell of a second embodiment of the present invention in which a biasing spring integrally formed with the shell is shown.

FIG. 5 is a perspective view of a portion of the shell of a third preferred embodiment of the present invention showing a removable, thin flexible spring disposed in the opening in the second side of the shell.

DETAILED DESCRIPTION OF THE DRAWINGS

The present invention will be described with respect to preferred embodiments of a device for cleaning the magnetic head or magnetic heads in flexible disk systems using so-called micro-floppy disks. These micro-floppy disks are flexible magnetic disks typically disposed in thin plastic shells approximately 3½ inches square. It should be recognized, however, that the present invention is not limited to use with flexible disk systems employing micro-floppy disks nor with such systems which use flexible disks necessarily disposed in plastic shells. The description to follow, therefore, is not to be taken in a limiting sense, but is made merely for the purpose of illustrating the general principles of the invention, since the scope of the invention is best defined by the appended claims.

Operational characteristics and structural features attributed to forms of the invention first described shall also be attributed to forms later described, unless such characteristics obviously are inapplicable or unless specific exception is made.

Referring first to FIG. 1, the preferred embodiment of the present invention comprises a shell 14 which rotatably supports a cleaning disk 16 provided with a hub 18. As can be seen in FIG. 2, the shell 14 comprises a first side 20, which is a generally flat, essentially square plastic member having a hub opening 22 to accommodate the hub 18 of the cleaning disk 16 and an opening 24 so that a magnetic head in a flexible disk system may access a first side of the cleaning disk 16 therethrough. The second side 26 of shell 14 is similar. Second side 26 is provided with a hub guide 28 on its inside surface which assists in centering the cleaning disk 16 within shell 14. A rectangular opening 30 in the second side 26 is similar to the opening 24 in the first side 20 and is located opposite the opening 24 to provide access by a magnetic head to a second side of the cleaning disk 16. The first side 20 and second side 26 are provided with upstanding edges facing one another so that a narrow pocket is formed between first side 20 and second side 26 to accommodate the cleaning disk 16. Various complementary guides (not shown) on the first side 20 and second side 26 of shell 14 may be provided to align first side 20 and second side 26 and/or to provide a snapping or other engagement between the first and second sides 20 and 26 of shell 14. Other shell configurations, of course, may be used.

The cleaning disk 16 is made of a lint-free, absorbent material of a porous nature so that contaminants and debris picked up from the magnetic head(s) are trapped and held by the cleaning disk surface. Preferably, the cleaning disk 16 is made from a lint-free, fibrous porous material having a white or other light color so that an operator may easily tell when the cleaning disk 16 is no longer suitable for use by checking for discoloration. The cleaning disk 16 should be relatively resistant to wear so that several cleanings can be accomplished with the same cleaning disk 16. Materials which may be used for the cleaning disk 16 include, but are not limited to, spunbonded polyester (e.g., Dupont Reemay) or spunbonded olefin.

As shown in FIG. 2, holes 44 and 46 are located in the hub 18 of the cleaning disk 16 to enable the device to simulate a magnetic disk and thereby enable the cleaning disk 16 to be rotated and controlled in the same manner as if a magnetic disk were positioned in the system. The different holes 44 and 46 are for different types of disk drives that may be employed in different systems. Of course, other hole configurations for use with different types of drives, as well as other hub configurations, are within the scope of the invention.

Referring further to FIG. 2, the second side 26 of the shell 14 includes two diametrically opposed disk saturating openings 32, which expose portions of the cleaning disk 16. The purpose of disk saturating openings 32 is to permit the application of cleaning fluid through the openings 32 which will then be absorbed by the cleaning disk 16 over an appropriate portion of its surface without requiring the removal of the cleaning disk 16 from the shell 14 or rotation of the cleaning disk 16. Depending upon the absorbancy and wetting action of the material of the cleaning disk 16, the size, number and locations of the disk saturating openings 16 may be other than as shown in FIG. 2. In the preferred embodiment described, the disk saturating openings have a width (measured radially with respect to the cleaning disk 16 center) and a maximum length (measured orthogonally with respect to the width) of slightly over $\frac{3}{4}$ inch.

Many types of cleaning solutions may be used to saturate the cleaning disk 14. For example, a typical isopropyl alcohol or a mixture of isopropyl alcohol and a fluorocarbon (e.g., freon) could be used. Any solution may be employed that has solvent properties such that it dissolves common contaminants found on heads, does not leave a residue on or harm the heads, and evaporates during a predetermined cleaning cycle (e.g., less than three minutes).

In cleaning the magnetic head of certain models of single magnetic head flexible disk systems, it is not desirable to have the cleaning disk 16 contact the pressure pad of the disk drive, as the pressure pad could be damaged by either the cleaning solution used or the material of the cleaning disk 16. A thin rectangular member 34 is used to cover the opening 30 in the second side 26 of shell 14 so that the pressure pad of a single magnetic head disk drive does not come into contact with the cleaning disk 16 or the cleaning solution. Thin member 34 may be adhesively backed paper which is pressed against the outside of the second side 26 of shell 14 to cover the opening 30. Materials other than paper may of course be used to form thin member 34, and thin member 34 may have a shape other than rectangular. In addition, methods other than the use of an adhesive may be used to attach thin member 34 to the second side 26. Biasing spring 36 is attached to thin member 34 such that when thin member 34 is attached to the second side 26 of shell 14, biasing spring 36 is within the opening 30 in the second side 26. Biasing spring 36 comprises a small thin metal member having an attachment portion 38 which adheres to the adhesive backing of thin member 34 and a biasing portion 40 bent at a slight angle with respect to the attachment portion 38 inwards towards the cleaning disk 16, pressing the cleaning disk 16 towards opening 24.

Referring now to FIG. 3, a partial cross-sectional view of the first preferred embodiment is shown with a magnetic head 42 of a single magnetic head flexible disk system shown in phantom with respect to the present invention during a procedure in which the magnetic head 42 is being cleaned.

To use the device of the present invention, portions of the cleaning disk 16 exposed by the disk saturating openings 32 are first saturated with cleaning solution through openings 32. The device is then inserted into a disk drive where a single magnetic head 42 contacts one side of the cleaning disk 16 via opening 24 in the first side 20 of shell 14. As can be seen in FIG. 3 the biasing spring 36 located on the opposite side of cleaning disk 16 from the magnetic head 42 presses the cleaning disk 16 against the magnetic head 42 so that as the cleaning disk 16 rotates, alternate wet and dry portions of cleaning disk 16 move across magnetic head 42 cleaning it.

Debris which has accumulated on the magnetic head or heads is dissolved by the cleaning fluid and carried away by the cleaning disk 16. The alternating wet-dry cycle facilitates cleaning and drying. Also, since the fibrous material of the cleaning disk 16 is substantially nonabrasive to a magnetic head, the drive system of the flexible disk system may be left engaged for a relatively long period of time without any damage to the magnetic head or heads.

The first preferred embodiment of the present invention is easily adaptable for use with flexible disk systems employing a magnetic head on each side of the flexible magnetic disk. By removing the thin member 34 which blocks the opening 30 in the second side 26 of shell 14, access to magnetic heads on each side of the device to contact the cleaning disk 16 are provided through openings 24 and 30 on opposite sides of the shell 14.

FIG. 4 shows a second embodiment of the present invention. This embodiment is identical to the first preferred embodiment which has been described, except as will be described below. In the second preferred embodiment of FIG. 4, instead of a biasing spring 36 attached to a thin member 34 which is in turn attached to the first side 20 of shell 14 as in the first preferred embodiment, a biasing member 106 and narrow connecting members 108 connecting the biasing member 106 to the second side 102 of the shell 110 are integrally formed with the second side 102 over the opening 104. Plastic is an example of a material which may be used to form the second side 102 and the integral biasing member 106 and narrow connecting members 108. In use in a flexible disk system employing a single magnetic head, biasing spring 106 acts similarly to biasing spring 36 which has been described with respect to the first preferred embodiment.

When the second preferred embodiment is used to clean the oppositely disposed magnetic heads in a dual magnetic head flexible disk system, biasing spring 106 is removed from over the opening 104 in the second side 102 of shell 14 by breaking the narrow connecting members 108. This is accomplished by pushing, pulling and/or twisting biasing spring 106 with respect to the second side 104. After biasing spring 106 is so removed, the second preferred embodiment of the device may be used in a dual magnetic head flexible disk system to clean oppositely disposed magnetic heads in the same manner as has been described with respect to the first preferred embodiment.

A third preferred embodiment of the present invention is shown in FIG. 5. In this embodiment, a biasing spring or member such as 36 in the first preferred embodiment or 106 in the second preferred embodiment is not used. Instead, disposed over the opening 204 in the second side 202 of shell 212, is thin flexible member 206 which is connected at a first end 208 to the second side 202 at one end of the opening 204, and is otherwise unconnected to the second side 202. The end 210 of thin flexible member 206 opposite to first end 208 at which thin flexible member 206 is connected to second side 202 and may be easily elastically displaced by pressing upon it in a direction generally parallel to the disk axis. When not in use, thin flexible member 206 lies within the nominal plane of the second side 202, and is not inclined towards the cleaning disk 16.

When the third preferred embodiment of the device is used to clean a magnetic head in a flexible disk system using a single magnetic head and an oppositely disposed pressure pad, the device is inserted into the disk drive system after the cleaning disk 16 has been saturated with cleaning fluid through the disk saturating openings 32 as has been described with respect to the first preferred embodiment. In the third preferred embodiment, the pressure pad of the flexible disk system presses the thin flexible member 206 against the single magnetic head enabling the cleaning disk 16 to clean that magnetic head in an alternating wet-dry cycle as has been described. However, as the pressure pad is not in contact with the cleaning disk 16 or the cleaning fluid disposed thereon, it does not sustain damage therefrom.

The third preferred embodiment of the present invention can be used in a flexible disk system to clean oppositely disposed magnetic heads by breaking off the thin flexible member 206 from the second side 202. The device of the third preferred embodiment can then be used in the same manner as has been previously described with respect to the first and second preferred embodiments in flexible disk systems employing magnetic heads on opposite sides of the disk.

There are many variations that are within the scope of the present invention which have not been described above. For example in the first and second preferred embodiments, an inflexible member may replace biasing spring 36 or biasing member 106 respectively, even though such would not provide the advantage afforded by an elastic member which provides some control over the pressure applied to the magnetic head. Hence, the claims are not to be limited to the preferred embodiments described.

What is claimed is:

1. A device for cleaning a magnetic head in a flexible disk system using a magnetic head on one side of a disk and a pressure pad on the opposite side of the disk, said device adaptable for cleaning opposing magnetic heads in a flexible disk system using a magnetic head on each side of a disk, said device comprising:

a cleaning disk made of absorbant and porous material and adapted to be saturated with a cleaning fluid;

a substantially flat shell rotatably supporting said cleaning disk within its interior, said shell including two sides, a first side having at least one opening for exposing said cleaning disk to a magnetic head of a flexible disk system using a magnetic head on one side of a disk and a pressure pad on the opposite side of the disk and a second side removably carrying a means for pressing on said cleaning disk opposite said opening so that said cleaning disk is pressed away from said second side and against said magnetic head, said means for pressing removable to expose an opening in said second side opposite said opening in said first side for exposing said cleaning disk to magnetic heads of a flexible disk system located on opposite sides of said cleaning disk.

2. A device as in claim 1 wherein said shell includes at least one other opening for facilitating saturation of a portion of the cleaning disk while the cleaning disk is in the shell.

3. A device as in claim 2 wherein said means for pressing on said cleaning disk comprises a thin flat member removably covering said opening in said second side, said member carrying a spring where said member covers said opening on the side of said member facing said cleaning disk, said spring being biased to press on said cleaning disk so that said cleaning disk is pressed against said magnetic head when said thin flat member covers said opening.

4. A device as in claim 3 wherein said thin flat member is adhesively coated to removably adhere to said shell adjacent said opening in said second side.

5. A device as in claim 4 wherein said thin flat member is paper.

6. A device as in claim 2 wherein said shell is of a plastic material and said means for pressing comprises a plastic tab inclined towards said cleaning disk in said opening in said second side, said plastic tab connected to said shell by at least one plastic member so as to be purposefully easily disconnected from said shell by breaking said plastic member.

7. A device as in claim 6 wherein said second side of said shell, said plastic tab and said plastic member are molded from a single piece of plastic.

8. A device as in claim 2 wherein said shell is of plastic material and said means for pressing comprises a thin flexible plastic tongue member at least partially opposite said opening in said first side, said tongue member attached at its proximate end to said second side and extending over said opening in said second side, said tongue member pressable toward its distal end by said pressure pad to flex with respect to said second side and press said cleaning disk against said magnetic head.

9. A device for cleaning a magnetic head in a flexible disk single sided recording system using a magnetic head on one side of a disk and a pressure pad on the opposite side of the disk, said device comprising:
- a cleaning disk made of an absorbant and porous material and adapted to be saturated with a cleaning fluid;
- a substantially flat shell rotatably supporting said cleaning disk within its interior, said shell including two sides, a first side having a first opening for exposing said cleaning disk to a magnetic head of a flexible disk system and a second side including a pressing member attached to the inside thereof opposite said first opening, said pressing member for pressing against said cleaning disk so that said cleaning disk is pressed against said magnetic head.

* * * * *